United States Patent
Peltola (10) Patent No.: US 7,088,289 B1
(45) Date of Patent: Aug. 8, 2006

(54) ANTENNA ADAPTATION METHOD, COMMUNICATION TERMINAL, DEVICE; MODULE AND COMPUTER PROGRAM PRODUCT

(75) Inventor: Ari Peltola, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/099,341

(22) Filed: Apr. 5, 2005

(51) Int. Cl.
*H01Q 3/00* (2006.01)

(52) U.S. Cl. ..................................... 342/377

(58) Field of Classification Search ............... 342/368, 342/372, 377, 378; 455/63.4, 67.16; 370/342, 370/441
See application file for complete search history.

(56) References Cited

U.S. PATENT DOCUMENTS

| | | | |
|---|---|---|---|
| 5,771,439 A * | 6/1998 | Kennedy et al. | 455/63.1 |
| 6,369,758 B1 * | 4/2002 | Zhang | 342/383 |
| 6,823,174 B1 * | 11/2004 | Masenten et al. | 455/63.4 |
| 2003/0152099 A1 * | 8/2003 | Chun et al. | 370/441 |

OTHER PUBLICATIONS

3GPP TS 25.214 V4.4.0 (Mar. 2002) 3rd Generation Partnership Project; Technical Specification Group Radio Access Network; Physical layer procedures (FDD) (Release 4), pp. 1-53, http://www.arib.or.jp/IMT-2000/V310Sep02/T63/Rel4/25/A25214-440.pdf.

* cited by examiner

*Primary Examiner*—Dao Phan
(74) *Attorney, Agent, or Firm*—Hollingsworth & Funk, LLC (57) ABSTRACT

The invention is related to a communication terminal, including means for determining possible antenna weight factor combinations, an antenna weight factor combination comprising an antenna weight factor for both power and phase; means for selecting primary antenna weight factors on the basis of bisectors of angles between a minimum phase offset and a maximum phase offset of the possible weight factor combinations; means for determining an optimum antenna weight factor by using the primary antenna weight factors; and means for signalling the optimum antenna weight factor to a network element.

26 Claims, 4 Drawing Sheets

FIG. 1

PRIOR ART

PRIOR ART

FIG. 4B

PRIOR ART

FIG. 4C

PRIOR ART

ANTENNA ADAPTATION METHOD, COMMUNICATION TERMINAL, DEVICE; MODULE AND COMPUTER PROGRAM PRODUCT

FIELD

The invention relates to an antenna adaptation method in a communication system, the communication system comprising at least one network element and at least one communication terminal, a communication terminal, a device, a module and a computer program product.

BACKGROUND

The use of systems including multiple antennas, such as an antenna array, in radio communication applications is of interest because of the increased performance achieved with these systems.

In an antenna group or in an antenna array, individual antenna elements are typically located close to one another, or approximately half a wavelength apart from one another. When adaptive antenna arrays are used, the basic principle is that radiation beams are narrow and they are directed as directly as possible at a desired receiver. One known method of using adaptive antenna arrays is that the most suitable beam is selected from various alternative beams.

In a digital system, the directing of antenna beams in the uplink is typically implemented by dividing a signal in base band parts into I and Q branches and by multiplying in a complex manner (phase and amplitude) the signal of each antenna element by appropriate weighting coefficients. In this case, an adaptive antenna array comprises not only antennas but also a signal processor, which automatically adapts antenna beams by using a control algorithm.

In Universal Mobile Telecommunications System (UMTS) Terrestrial Radio Access Network, UTRAN, the user terminal estimates radio channels and computes a phase adjustment and/or an amplitude (power) adjustment for adapting antennas of the UTRAN access point to maximise the power the user terminal receives. The user terminal signals the information on the phase and/or power adjustment to the UTRAN access point (the network element). The problem is that in the closed loop mode 2, there are up to 16 possible combinations of phase and power adjustments to be computed in every time slot in the user terminal. This kind of computing is a time and resource consuming process.

BRIEF DESCRIPTION OF THE INVENTION

According to an aspect of the invention, there is provided an antenna adaptation method in a communication system, the communication system comprising at least one network element and at least one communication terminal, the method comprising: determining possible antenna weight factor combinations, an antenna weight factor combination comprising an antenna weight factor for both power and phase; selecting primary antenna weight factors on the basis of bisectors of angles between a minimum phase offset and a maximum phase offset of the possible antenna weight factor combinations; determining an optimum antenna weight factor by using the primary antenna weight factors; and signalling the optimum antenna weight factor to the network element.

According to an aspect of the invention, there is provided a communication terminal, comprising: means for determining possible antenna weight factor combinations, an antenna weight factor combination comprising an antenna weight factor for both power and phase; means for selecting primary antenna weight factors on the basis of bisectors of angles between a minimum phase offset and a maximum phase offset of the possible antenna weight factor combinations; means for determining an optimum antenna weight factor by using the primary antenna weight factors; and means for signalling the optimum antenna weight factor to a network element.

According to an aspect of the invention, there is provided a communication terminal, comprising: means for storing possible antenna weight factor combinations, an antenna weight factor combination comprising an antenna weight factor for both power and phase; means for selecting primary antenna weight factors on the basis of bisectors of angles between a minimum phase offset and a maximum phase offset of the possible antenna weight factor combinations; means for determining an optimum antenna weight factor by using the primary antenna weight factors; and means for signalling the optimum antenna weight factor to a network element.

According to an aspect of the invention, there is provided a device, comprising: means for determining possible antenna weight factor combinations, an antenna weight factor combination comprising an antenna weight factor for both power and phase; means for selecting primary antenna weight factors on the basis of bisectors of angles between a minimum phase offset and a maximum phase offset of the possible antenna weight factor combinations; means for determining an optimum antenna weight factor by using the primary antenna weight factors; and means for signalling the optimum antenna weight factor to a network element.

According to an aspect of the invention, there is provided a device, comprising: means for storing possible antenna weight factor combinations, an antenna weight factor combination comprising an antenna weight factor for both power and phase; means for selecting primary antenna weight factors on the basis of bisectors of angles between a minimum phase offset and a maximum phase offset of the possible antenna weight factor combinations; means for determining an optimum antenna weight factor by using the primary antenna weight factors; and means for signalling the optimum antenna weight factor to a network element.

According to an aspect of the invention, there is provided a computer program product encoding a computer program of instructions for executing a computer process for antenna adaptation, the process comprising: determining possible antenna weight factor combinations, an antenna weight factor combination comprising an antenna weight factor for both power and phase; selecting primary antenna weight factors on the basis of bisectors of angles between a minimum phase offset and a maximum phase offset of the possible antenna weight factor combinations; determining an optimum antenna weight factor by using the primary antenna weight factors; and constructing a message for signalling the optimum antenna weight factor to a network element.

According to an aspect of the invention, there is provided a computer program product encoding a computer program of instructions for executing a computer process for antenna adaptation, the process comprising: storing possible antenna weight factor combinations, an antenna weight factor combination comprising an antenna weight factor for both power and phase; selecting primary antenna weight factors on the basis of bisectors of angles between a minimum phase offset and a maximum phase offset of the possible antenna weight factor combinations; determining an optimum antenna weight factor by using the primary antenna weight factors; and constructing a message for signalling the optimum antenna weight factor to a network element.

According to another aspect of the invention, there is provided a module, comprising: means for determining possible antenna weight factor combinations, an antenna weight factor combination comprising an antenna weight factor for both power and phase; means for selecting primary antenna weight factors on the basis of bisectors of angles between a minimum phase offset and a maximum phase offset of the possible antenna weight factor combinations; means for determining an optimum antenna weight factor by using the primary antenna weight factors.

According to another aspect of the invention, there is provided a module, comprising: means for storing possible antenna weight factor combinations, an antenna weight factor combination comprising an antenna weight factor for both power and phase; means for selecting primary antenna weight factors on the basis of bisectors of angles between a minimum phase offset and a maximum phase offset of the possible antenna weight factor combinations; means for determining an optimum antenna weight factor by using the primary antenna weight factors.

According to another aspect of the invention, there is provided a communication terminal, configured to: first determine possible antenna weight factor combinations, an antenna weight factor combination comprising an antenna weight factor for both power and phase; select primary antenna weight factors on the basis of bisectors of angles between a minimum phase offset and a maximum phase offset of the possible antenna weight factor combinations; second determine an optimum antenna weight factor by using the primary antenna weight factors; and signal the optimum antenna weight factor to the network element.

According to another aspect of the invention, there is provided a communication terminal, configured to: store possible antenna weight factor combinations, an antenna weight factor combination comprising an antenna weight factor for both power and phase; select primary antenna weight factors on the basis of bisectors of angles between a minimum phase offset and a maximum phase offset of the possible antenna weight factor combinations; determine an optimum antenna weight factor by using the primary antenna weight factors; and signal the optimum antenna weight factor to the network element.

According to another aspect of the invention, there is provided a device, configured to: determine possible antenna weight factor combinations, an antenna weight factor combination comprising an antenna weight factor for both power and phase; select primary antenna weight factors on the basis of bisectors of angles between a minimum phase offset and a maximum phase offset of the possible antenna weight factor combinations; determine an optimum antenna weight factor by using the primary antenna weight factors; and signal the optimum antenna weight factor to the network element.

According to another aspect of the invention, there is provided a device, configured to: store possible antenna weight factor combinations, an antenna weight factor combination comprising an antenna weight factor for both power and phase; select primary antenna weight factors on the basis of bisectors of angles between a minimum phase offset and a maximum phase offset of the possible antenna weight factor combinations; determine an optimum antenna weight factor by using the primary antenna weight factors; and signal the optimum antenna weight factor to the network element.

According to another aspect of the invention, there is provided a module, configured to: determine possible antenna weight factor combinations, an antenna weight factor combination comprising an antenna weight factor for both power and phase; select primary antenna weight factors on the basis of bisectors of angles between a minimum phase offset and a maximum phase offset of the possible antenna weight factor combinations; determine an optimum antenna weight factor by using the primary antenna weight factors.

According to another aspect of the invention, there is provided a module, configured to: store possible antenna weight factor combinations, an antenna weight factor combination comprising an antenna weight factor for both power and phase; select primary antenna weight factors on the basis of bisectors of angles between a minimum phase offset and a maximum phase offset of the possible antenna weight factor combinations; determine an optimum antenna weight factor by using the primary antenna weight factors.

The invention provides several advantages.

In an embodiment of the invention, the computation of the optimal phase and/or antenna adjustment is substantially simplified and thus quicker.

LIST OF DRAWINGS

In the following, the invention will be described in greater detail with reference to the embodiments and the accompanying drawings, in which.

DESCRIPTION OF EMBODIMENTS

Figure 1:
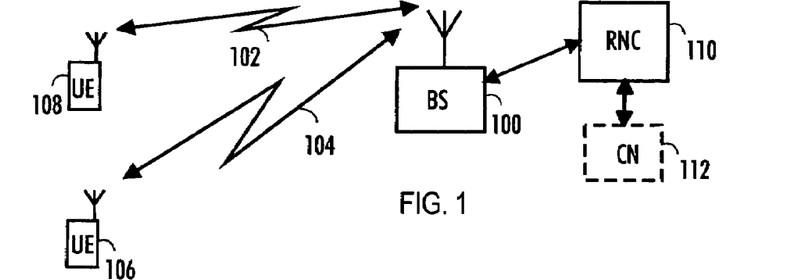
FIG. 1 shows an example of a communication system.

With reference to FIG. 1, we examine an example of a communication system to which embodiments of the invention can be applied. The present invention can be applied to various communication systems. One example of such a communication system is the Universal Mobile Telecommunications System (UMTS) radio access network. It is a radio access network which includes wideband code division multiple access (WCDMA) technology and can also offer real-time circuit and packet switched services. The embodiments are not, however, restricted to the systems given as examples but a person skilled in the art may apply the solution to other communication systems provided with the necessary properties.

It is clear to a person skilled in the art that the embodiments of the invention can be applied to systems utilizing different modulation methods or air interface standards.

FIG. 1 is a simplified illustration of a data transmission system to which the solution according to the invention is applicable. This is a part of a cellular radio system, which comprises a base station (or node B) 100, which has bi-directional radio links 102 and 104 to subscriber terminals 106 and 108. The subscriber terminals may be fixed, vehicle-mounted or portable. The base station includes transceivers, for instance. From the transceivers of the base station, there is a connection to an antenna unit that establishes the bi-directional radio links to the subscriber terminals. The base station is further connected to a controller 110, such as a radio network controller (RNC), which transmits the connections of the terminals to the other parts of the network. The radio network controller controls in a centralized manner several base stations (or node Bs) connected to it. The radio network controller is further connected to a core network 112 (CN). Depending on the system, the counterpart on the CN side can be a mobile services switching centre (MSC), a media gateway (MGW) or a serving GPRS (general packet radio service) support node (SGSN), etc.

The cellular radio system can also communicate with other networks, such as a public switched telephone network or the Internet.

Figure 2:
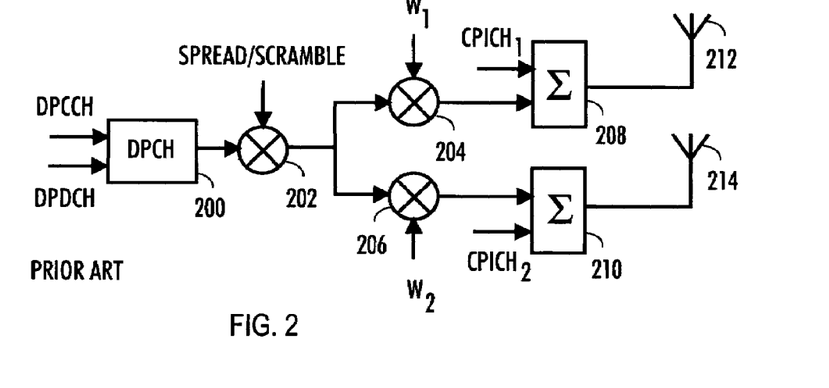
FIG. 2 shows an example of a generic downlink transmitter structure.

FIG. 2 shows an example of a prior art downlink transmitter structure that supports a closed loop mode transmit diversity for a Dedicated Physical Channel (DPCH) transmission. The transmitter may be used in connection with the embodiment described by means of FIG. 3.

The transmitter is coupled to an antenna array including two antennas 212 and 214.

In block 200, a Dedicated Physical Channel signal is generated. The Dedicated Physical Control Channel (DPCCH) and Dedicated Physical Data Channel (DPDCH) are time multiplexed on DPCH. Transmit Power Control (TPC), Transport Format Combination Indicator (TFCI) and PILOT fields are control information and DATA field is user data.

Channel coding, interleaving and spreading/scrambling are carried out in a non-diversity mode. The spreading/scrambling is typically carried out by multiplying a signal with a selected pseudo-random code. The multiplying is depicted in FIG. 2 with multiplier 202.

A complex valued wide-band signal is fed to both transmission antenna branches (the first branch includes multiplier 204 and adder 208 and the second branch includes multiplier 206 and adder 210). The signal is weighted with antenna specific weight factors $w_1$ and $w_2$ by multipliers 204, and 206. The weight factors are typically complex valued signals.

In the closed loop mode 2, the weight factors, that is phase and/or amplitude adjustment factors, are determined by a user terminal that signals them to a UTRAN access point, in other words to a network element, using the D-sub field of the Feed Back Information (FBI) field of the uplink DPCH.

The user terminal uses the Common Pilot Channel (CPICH) to estimate the uplink radio channels. Once in every time slot, the user terminal computes a phase adjustment factor and/or an amplitude (power) adjustment factor to be applied at the UTRAN access point to maximise the power received by the user terminal.

The user terminal transmits the information on the phase and/or power settings to the UTRAN access point. Feedback Signalling Message (FSM) bits are transmitted in the D-sub field of the FBI field. The D-sub field is dedicated to the signalling concerning the transmit diversity of the closed loop mode. The adjustments are carried out at the UTRAN Access Point at the beginning of the downlink DPCCH pilot field.

In the closed loop mode 2, there are altogether 16 possible combinations of phase and power adjustment factors from which the user terminal selects and transmits a Feedback Signalling Message (FSM).

The prior art amplitude and phase adjusting by using weight factors is explained in further detail in 3GPP TS 25.214 standard (3GPP=3rd Generation Partnership Project).

Figures 3, 4A:
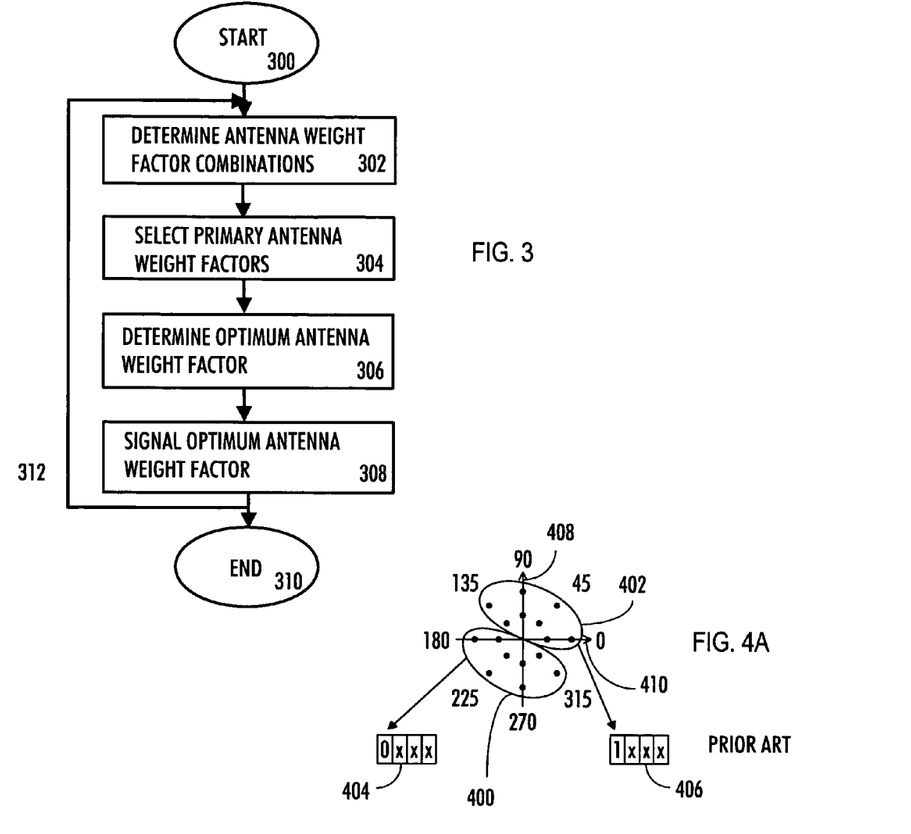
FIG. 3 is a flowchart.
FIGS. 4A–I illustrate antenna weight combinations.

Next, an embodiment of the antenna adaptation method is explained in further detail by means of FIG. 3. The embodiment is used in a communication system comprising at least one network element and at least one communication terminal. The method starts in block 300.

In block 302, possible antenna weight factor combinations are determined. An antenna weight factor combination comprises an antenna weight factor for both power and phase.

In FIGS. 4A–I, possible antenna weight factor combinations for the closed loop mode 2 according to prior art are depicted. Horizontal axis 410 and vertical axis 408 define a space where possible phase and power shift (offset) combinations that can be used in a diversity antenna are marked with dots. The dots are in two circles: the outer circle represents 0.8 dB power adjustment and the inner circle 0.2 dB power adjustment. The same two power levels are also used for the first antenna. The phase offset, meaning here also a possible phase adjustment factor, may get the following values: 0, 45, 90, 135, 180, 225, 270 or 315 degrees as shown in FIGS. 4A–I. The possible antenna weight factor combinations include a power adjustment factor and a phase adjustment factor, thus there are 16 possible antenna weight factor combinations on the whole.

In block 304, primary antenna weight factors are selected on the basis of bisectors of angles between a minimum phase offset and a maximum phase offset of the possible weight factor combinations.

Instead of testing all possible FSM combinations as in prior art, only selected primary antenna weight factors are tested. The primary antenna weight factors are defined in this embodiment for phase, while power is kept constant for all antennas. Primary antenna weights are chosen to be perpendicular to decision boundaries that are bisectors of the angles between a minimum phase offset and a maximum phase offset depicted in FIG. 4.

In the following, the prior art calculation is explained in greater detail by means of FIGS. 4A–4I. Attention should be paid to the fact that bits, which may be either 1 or 0, are marked with x in the blocks illustrating FSM messages.

In FIG. 4A, the first bit for the FSM word is obtained from two different groups 400 or 402 of power and phase shifts. In this case, 16 potential FSM messages exist which are marked in Figure 0xxx 404 and 1xxx 406.

Figure 4B:
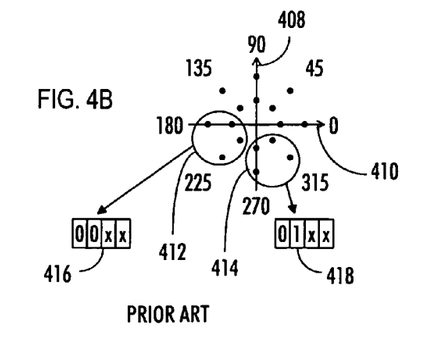

In FIG. 4B, when the MSB bit of FSM has been selected to be 0, the second bit for the FSM word is obtained from two different groups 412 or 414 of power and phase shifts. Potential messages are: 00xx 416 and 01xx 418.

Figure 4C:
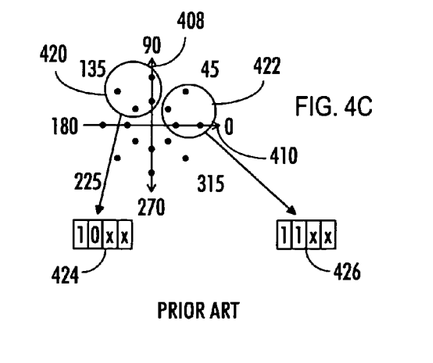

Also in FIG. 4C, when the MSB bit of FSM has been selected to be 1, the second bit for the FSM word is obtained from two different groups 420 or 422 of power and phase shifts. In this case, eight potential FSM messages exist: 10xx 424 and 11xx 426.

Figures 4D, 4E:
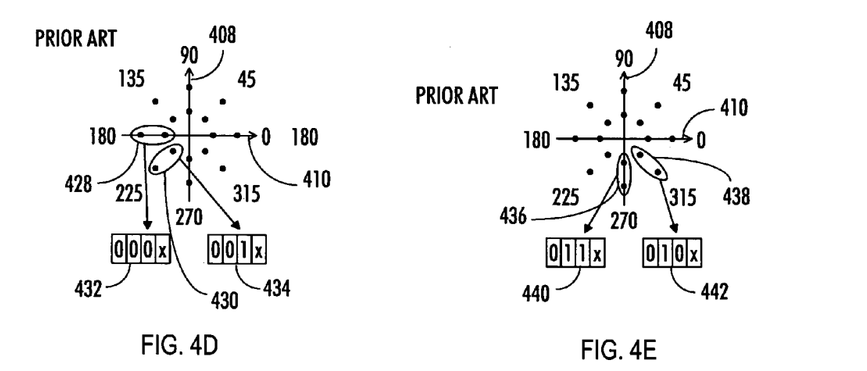

In FIG. 4D, when the first and second phase bits are selected to be 00, the third bit for the FSM word is obtained from two different groups 428 or 430 of power and phase shifts. In this case, four potential FSM messages exist: 000x 432 and 001x 434.

Also in FIG. 4E, when the first and second phase bits are selected to be 01, the third bit for the FSM word is obtained from two different groups 436 or 438 of power and phase shifts. In this case, four potential FSM messages exist: 011x 440 and 010x 442.

Figure 4F:
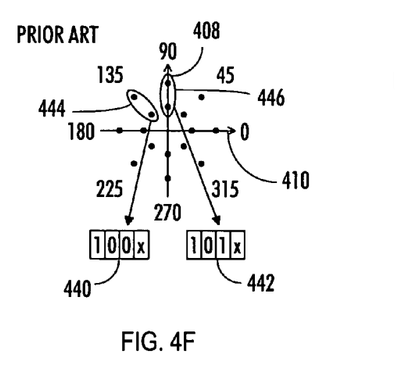

Also in FIG. 4F, when the first and second phase bits are selected to be 10, the third bit for the FSM word is obtained from two different groups 444 or 446 of power and phase shifts. In this case, four potential FSM messages exist: 100x 440 and 101x 442.

Figure 4G:
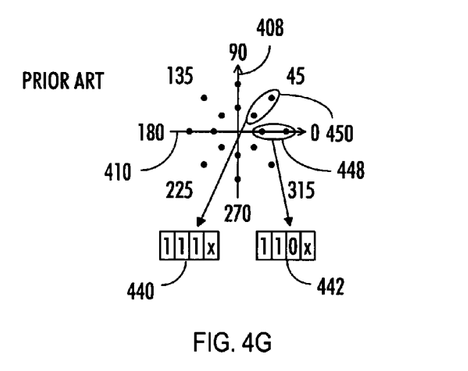

Also in FIG. 4G, when the first and second phase bits are selected to be 11, the third bit for the FSM word is obtained from two different groups 448 or 450 of power and phase shifts. In this case, four potential FSM messages exist: 111x 440 and 110x 442.

Figure 4H:
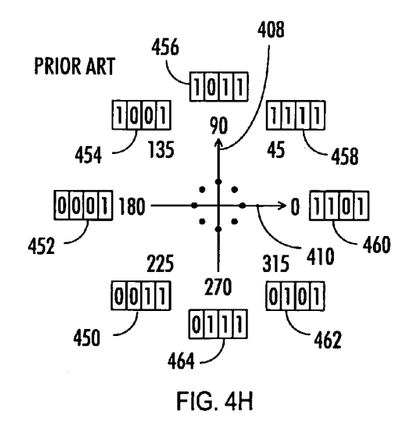

In FIG. 4H, FSM words for 0.2 dB power adjustment and for different phase adjustments are depicted; word 0011 450 means a phase shift of 225 degrees, word 0001 452 means a phase shift of 180 degrees, word 1001 454 means a phase shift of 135 degrees, word 1011 456 means a phase shift of 90 degrees, word 1111 458 means a phase shift of 45 degrees, word 1101 460 means a phase shift of 0 degrees, word 0101 462 means a phase shift of 315 degrees and word 0111 464 means a phase shift of 270 degrees.

Figure 4I:
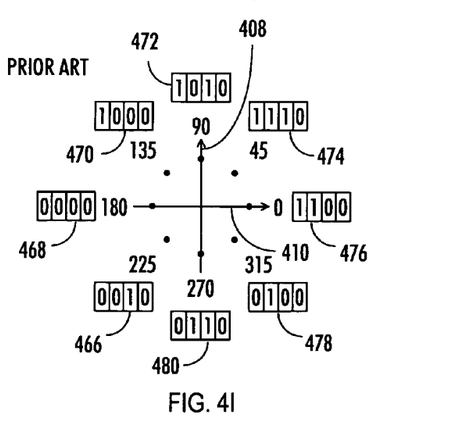

In FIG. 4I, FSM words for 0.8 dB power adjustment and for different phase adjustments are depicted; word 0010 466 means a phase shift of 225 degrees, word 0000 468 means a phase shift of 180 degrees, word 1000 470 means a phase shift of 135 degrees, word 1010 472 means a phase shift of 90 degrees, code word 1110 474 means a phase shift of 45 degrees, word 1100 476 means a phase shift of zero degrees, word 0100 478 means a phase shift of 315 degrees and word 0110 480 means a phase shift of 270 degrees.

Recommendable primary antenna weight factors for phase adjustment for an antenna array comprising two antennas are listed in table 1. Notation x is used in table 1, when the FBI bit is allowed to be either 0 or 1.

Σ denotes a summation operation.

The selection of the optimum antenna weight factor may be calculated as follows:

$$w(p,a) = \text{Max}[P_{rec}(p,a)] \qquad (2)$$

wherein $P_{rec}(p,a)$ is obtained from equation (1), and

Max denotes for the maximum.

Next, an example of the lightened testing is explained in further detail by means of FIGS. 5A–5F. In the example, an antenna array comprises two antenna elements. It is obvious to a person skilled in the art that the antenna array may include more antennas than two.

Bits, which may be either 1 or 0, are marked with x in the blocks illustrating FSM messages.

In the example, instead of testing all potential FSM messages, only two combined phase and power adjustment coefficients, i.e. primary antenna weight factors, are tested. The primary antenna weight factors are chosen to be perpendicular to the decision boundaries that are bisectors of angles between the minimum and the maximum phase offset. In FIGS. 5A–5F, the phase offsets obtained by using the bisectors are marked with dots in the space defined by horizontal axis 410 and vertical axis 408.

TABLE 1

| Bit in FSM to be determined | $[b_3 b_2 b_1 b_0]$ | min(ph) | max(ph) | Bisector of angle | $w_t(0)$ degrees | $w_t(1)$ degrees |
|---|---|---|---|---|---|---|
| $b_3(4m)$ | [x x x x] | 0 | 315 | 157.5 | 67.5 | 247.5 |
| $b_2(4m + 1)$ | [x x x x] | 180 | 315 | 247.5 | 157.5 | 337.5 |
| $b_1(4m + 2)$ | [0 0 x x] | 180 | 225 | 202.5 | 112.5 | 292.5 |
|  | or | or | or | or |  |  |
|  | [0 0 x x] | 0 | 45 | 22.5 |  |  |
| $b_0(4m + 2)$ | [0 1 x x] | 270 | 315 | 292.5 | 202.5 | 22.5 |
|  | or | or | or | or |  |  |
|  | [1 0 x x] | 90 | 135 | 112.5 |  |  |

Variables $b_3(4m)$, $b_2(4m+1)$, $b_1(4m+2)$ and $b_0(4m+2)$ are bits to be determined for an FSM message.

In block 306, an optimum antenna weight factor is determined by using the primary antenna weight factors. The selection of the best antenna and/or power adjustment may be carried out by using the following equations, where a received power with different antenna weights (in the example of table 1 $w_t(0)$ and $w_t(1)$) is calculated first and then the combination giving the maximum reception power is determined.

For two antennas, the received power with different phase and/or power adjustment may be calculated as follows:

$$P_{rec}(p, a) = \sum_{f=0}^{N_F - 1} \left[ a\hat{h}_c^1(f) + \sqrt{1 - a^2} \, w(p)\hat{h}_c^2(f) \right], \qquad (1)$$

wherein f denotes a receiver finger index, $N_F$ denotes the number of receiver fingers, a denotes amplitude for transmit antenna 1, $\hat{h}_c^1(f)$ is a Primary Common Pilot Channel (P-CPICH) channel estimate for the first antenna, w(p) denotes a primary antenna weight factor, $\hat{h}_c^2(f)$ is a P-CPICH channel estimate for the second antenna, and Recommendable primary antenna weight factors for phase adjustment for an antenna array comprising two antennas are listed in table 1.

Figure 5A:
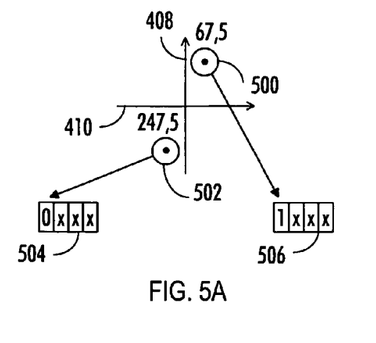
FIGS. 5A–F illustrate an embodiment of the invention.

In FIG. 5A, the first bit for the FSM word is obtained from two different primary antenna weight factors 500 and 502. In this case, potential FSM messages are: 0xxx 504 and 1xxx 506.

Figure 5B:
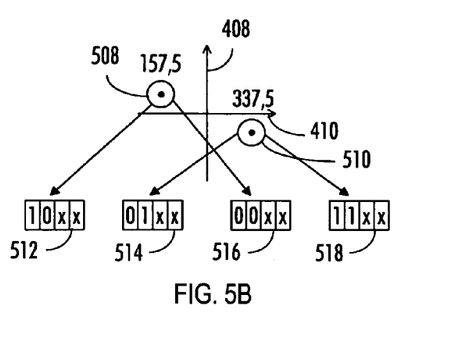

In FIG. 5B, the second bit for the FSM word is obtained from two different primary antenna weight factors 508 and 510. In this case, potential FSM messages are: 10xx 512, 01xx 514, 00xx 516 and 11xx 518.

Figure 5C:
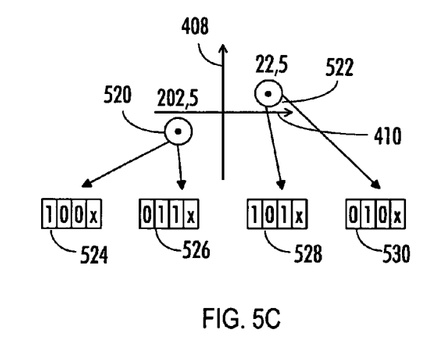

In FIG. 5C, when the first and second phase bits are selected to be either 01 or 10, the third bit for the FSM word is obtained from two different primary antenna weight factors 520 and 522. In this case, potential FSM messages are: 100x 524, 011x 526, 101x 528 and 010x 530.

Figure 5D:
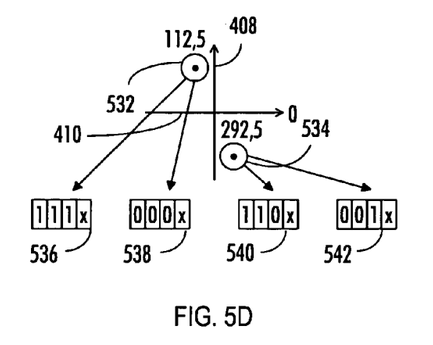

Also in FIG. 5D, when the first and second phase bits are selected to be either 00 or 11, the third bit for the FSM word is obtained from two different primary antenna weight factors 532 and 534. In this case, potential FSM messages are: 111x 536, 000x 538, 110x 540 and 001x 542.

Figure 5E:
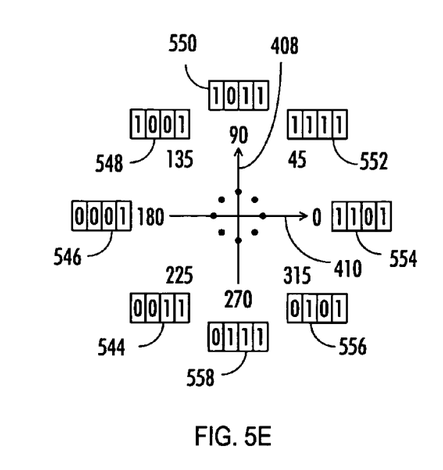

In FIG. 5E, FSM words for 0.2 dB power adjustment and for different phase adjustments are depicted; word 0011 544 means a phase shift of 225 degrees, word 0001 546 means a phase shift of 180 degrees, word 1001 548 means a phase shift of 135 degrees, word 1011 550 means a phase shift of 90 degrees, word 1111 552 means a phase shift of 45 degrees, word 1101 554 means a phase shift of 0 degrees, word 0101 556 means a phase shift of 315 degrees and word 0111 558 means a phase shift of 270 degrees.

Figure 5F:
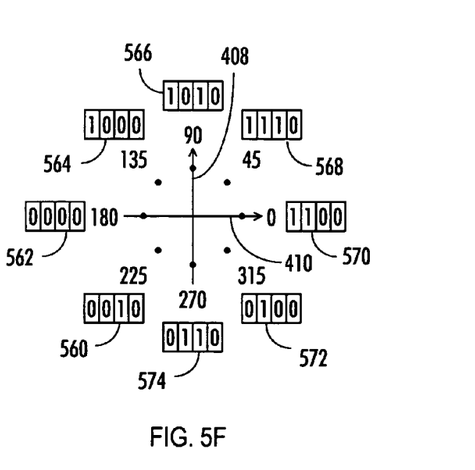

In FIG. 5F, FSM words for 0.8 dB power adjustment and for different phase adjustments are depicted; word 0010 560 means a phase shift of 225 degrees, word 0000 562 means a phase shift of 180 degrees, word 1000 564 means a phase shift of 135 degrees, word 1010 566 means a phase shift of 90 degrees, word 1110 568 means a phase shift of 45 degrees, word 1100 570 means a phase shift of 0 degrees, word 0100 572 means a phase shift of 315 degrees and word 0110 574 means a phase shift of 270 degrees.

As can be seen by comparing FIG. 4H with FIG. 5E and FIG. 4I with FIG. 5F, the obtained code words are the same.

In block 308, the optimum antenna weight factor is signalled to the network element by using an appropriate prior art signalling message, typically the Feedback Signalling Message (FSM). In prior art (in the 3rd Generation Partnership Project, 3GPP, standard), an FSM word is transmitted in the portion of the FBI field of uplink DPCCH slots assigned to the closed loop mode transmit diversity called a D-sub field.

The embodiment ends in block 310. Arrow 312 depicts how the embodiment may be repeated for instance for a new time slot.

Underneath is presented a table illustrating the decrease in the computational complexity attained by the embodiment:

TABLE 2

| FSM calculation algorithm | Prior art method | Method according to the embodiment |
|---|---|---|
| Weight combinations tested for first FBI ($b_3$) | 16 | 2 |
| Weight combinations tested for second FBI ($b_2$) | 8 | 2 |
| Weight combinations tested for third FBI ($b_1$) | 4 | 2 |
| Weight combinations tested for fourth FBI ($b_0$) | 2 | 2 |

The embodiments may be realized in an electronic device, including a controller. The controller may be configured to perform at least some of the steps described in connection with the flowchart of FIG. 3.

The embodiments may be implemented as a computer program comprising instructions for executing a computer process for determining possible antenna weight factor combinations, an antenna weight factor combination comprising an antenna weight factor for both power and phase; selecting primary antenna weight factors on the basis of bisectors of angles between a minimum phase offset and a maximum phase offset of the possible weight factor combinations; and determining an optimum antenna weight factor by using the primary antenna weight factors.

Figure 6:
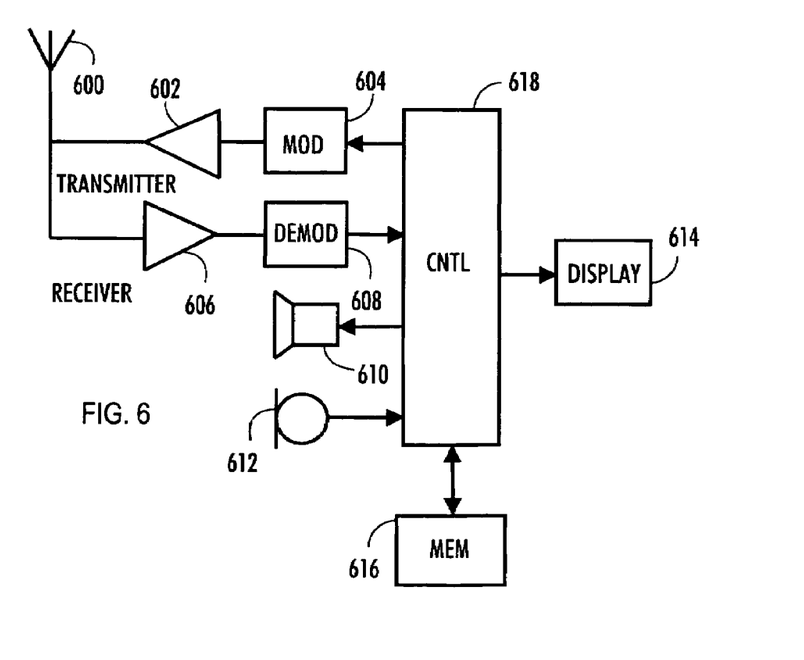
FIG. 6 shows an example of a communication terminal.

FIG. 6 shows a simplified example of a user terminal whereto the embodiments of the invention can be applied. The user terminal is taken herein as an example of a communication terminal. The terminal may be a mobile telephone or a microcomputer, for example, without being restricted thereto.

The terminal comprises an antenna 600 with which signals are both transmitted and received via a duplex filter.

The terminal further comprises a transmitter 602 to amplify and transmit a modulated signal to the antenna, a modulator 604 modulating the carrier wave by a data signal comprising the desired information in accordance with a selected modulation method, a receiver 606 which amplifies the signal supplied from the antenna and down-converts the signal to a selected intermediate frequency or directly to base band, and a demodulator 608 demodulating the received signal to enable a data signal to be separated from the carrier wave.

The user terminal also comprises a control block 618 comprising, for example, control and calculation means for controlling the operation of the different parts of the terminal, means for processing the speech of a user or the data generated by the user, such as a digital signal processing (DSP) processor comprising, for example, channel correction functions compensating for interference in the signal caused by the radio channel, A/D converters converting an analogue signal into a digital one by sampling and quantizing the base band signal, D/A converters converting a digital signal to an analogue one by a reverse method, filters at the receiver which filter frequencies outside a desired frequency band or, which in band-restricted systems restrict the band width of the output at the transmitter, and coding and decoding means for both channel and speech coding.

Furthermore, in spread-spectrum systems, such as wideband code division multiple access (WCDMA used in UMTS) systems, the spectrum of the signal is spread at the transmitter by means of a pseudo-random spreading code over a wide band and despread at the receiver, in an attempt to increase the channel capacity.

The control block also comprises means for arranging the signal to be transmitted and the signalling information to conform to the air interface standard of the system used. In the embodiment, the control block comprises means for determining possible antenna weight factor combinations, selecting primary phase antenna weight factors, determining an optimum antenna weight factor and signalling the optimum antenna weight factor to the network element via the transmitter and the antenna.

The user interface of the terminal comprises a loudspeaker or an earpiece 610, a microphone 612, a display 614 and possibly a keypad and/or a joystick or a similar device. The user interface devices communicate with the control block. In FIG. 6, a memory block 616 is also depicted.

The embodiments of the antenna adaptation method can mainly be implemented by software in the control block including, for instance, instructions for executing a computer process for antenna adaptation, the process comprising: storing possible antenna weight factor combinations, an antenna weight factor combination comprising an antenna weight factor for both power and phase; selecting primary antenna weight factors on the basis of bisectors of angles between a minimum phase offset and a maximum phase offset of the possible weight factor combinations; and determining an optimum antenna weight factor by using the primary antenna weight factors.

Different hardware implementations are also feasible, e.g. a circuit built of separate logics components or one or more client-specific integrated circuits (Application-Specific Integrated Circuit, ASIC). A hybrid of software and hardware implementations is also feasible.

The embodiments of the antenna adaptation method can also be implemented as a module that may be installed, for instance, to a communication terminal.

Even though the invention has been described above with reference to an example according to the accompanying drawings, it is clear that the invention is not restricted thereto but it can be modified in several ways within the scope of the appended claims.

The invention claimed is:

1. An antenna adaptation method in a communication system, the communication system comprising at least one network element and at least one communication terminal, the method comprising:
   determining possible antenna weight factor combinations, an antenna weight factor combination comprising an antenna weight factor for both power and phase;
   selecting primary antenna weight factors on the basis of bisectors of angles between a minimum phase offset and a maximum phase offset of the possible antenna weight factor combinations;
   determining an optimum antenna weight factor by using the primary antenna weight factors; and
   signalling the optimum antenna weight factor to the network element.

2. The method of claim 1, further comprising choosing the primary antenna weights to be perpendicular to decision boundaries that are bisectors of the angles between a minimum phase offset and a maximum phase offset.

3. The method of claim 1, wherein the possible antenna weight factor combinations comprise a phase adjustment factor that is one of the following values: 0, 45, 90, 135, 180, 225, 270 or 315 degrees.

4. The method of claim 1, further comprising signalling the optimum antenna weight factor to the network element by using a Feedback Signalling Message (FSM).

5. The method of claim 1, further comprising implementing the antenna adaptation method in a communication system supporting a closed loop mode transmit diversity.

6. A communication terminal, comprising:
   means for determining possible antenna weight factor combinations, an antenna weight factor combination comprising an antenna weight factor for both power and phase;
   means for selecting primary antenna weight factors on the basis of bisectors of angles between a minimum phase offset and a maximum phase offset of the possible antenna weight factor combinations;
   means for determining an optimum antenna weight factor by using the primary antenna weight factors; and
   means for signalling the optimum antenna weight factor to a network element.

7. A communication terminal, comprising:
   means for storing possible antenna weight factor combinations, an antenna weight factor combination comprising an antenna weight factor for both power and phase;
   means for selecting primary antenna weight factors on the basis of bisectors of angles between a minimum phase offset and a maximum phase offset of the possible antenna weight factor combinations;
   means for determining an optimum antenna weight factor by using the primary antenna weight factors; and
   means for signalling the optimum antenna weight factor to a network element.

8. A device, comprising:
   means for determining possible antenna weight factor combinations, an antenna weight factor combination comprising an antenna weight factor for both power and phase;
   means for selecting primary antenna weight factors on the basis of bisectors of angles between a minimum phase offset and a maximum phase offset of the possible antenna weight factor combinations;
   means for determining an optimum antenna weight factor by using the primary antenna weight factors; and
   means for signalling the optimum antenna weight factor to a network element.

9. A device, comprising:
   means for storing possible antenna weight factor combinations, an antenna weight factor combination comprising an antenna weight factor for both power and phase;
   means for selecting primary antenna weight factors on the basis of bisectors of angles between a minimum phase offset and a maximum phase offset of the possible antenna weight factor combinations;
   means for determining an optimum antenna weight factor by using the primary antenna weight factors; and
   means for signalling the optimum antenna weight factor to a network element.

10. The device of claim 9, further comprising means for choosing the primary antenna weights to be perpendicular to decision boundaries that are bisectors of the angles between a minimum phase offset and a maximum phase offset.

11. The device of claim 9, further comprising means for storing the possible antenna weight factor combinations which comprise a phase adjustment factor that is one of the following values: 0, 45, 90, 135, 180, 225, 270 or 315 degrees.

12. The device of claim 9, further comprising means for signalling the optimum antenna weight factor to the network element by using a Feedback Signalling Message (FSM).

13. The device of claim 9, further comprising means for supporting a closed loop mode transmit diversity.

14. A computer program product encoding a computer program of instructions for executing a computer process for antenna adaptation, the process comprising:
   determining possible antenna weight factor combinations, an antenna weight factor combination comprising an antenna weight factor for both power and phase;
   selecting primary antenna weight factors on the basis of bisectors of angles between a minimum phase offset and a maximum phase offset of the possible antenna weight factor combinations;
   determining an optimum antenna weight factor by using the primary antenna weight factors; and
   constructing a message for signalling the optimum antenna weight factor to a network element.

15. A computer program product encoding a computer program of instructions for executing a computer process for antenna adaptation, the process comprising:
   storing possible antenna weight factor combinations, an antenna weight factor combination comprising an antenna weight factor for both power and phase;
   selecting primary antenna weight factors on the basis of bisectors of angles between a minimum phase offset and a maximum phase offset of the possible antenna weight factor combinations;
   determining an optimum antenna weight factor by using the primary antenna weight factors; and
   constructing a message for signalling the optimum antenna weight factor to a network element.

16. The computer program product of claim 14, further comprising instructions for choosing the primary antenna weights to be perpendicular to decision boundaries that are bisectors of the angles between a minimum phase offset and a maximum phase offset.

17. The computer program product of claim 14, wherein the possible antenna weight factor combinations comprise a phase adjustment factor that is one of the following values: 0, 45, 90, 135, 180, 225, 270 or 315 degrees.

18. The computer program product of claim 14, further comprising instructions for signalling the optimum antenna weight factor to the network element by using a Feedback Signalling Message (FSM).

19. A module, comprising:
means for determining possible antenna weight factor combinations, an antenna weight factor combination comprising an antenna weight factor for both power and phase;
means for selecting primary antenna weight factors on the basis of bisectors of angles between a minimum phase offset and a maximum phase offset of the possible antenna weight factor combinations;
means for determining an optimum antenna weight factor by using the primary antenna weight factors.

20. A module, comprising:
means for storing possible antenna weight factor combinations, an antenna weight factor combination comprising an antenna weight factor for both power and phase;
means for selecting primary antenna weight factors on the basis of bisectors of angles between a minimum phase offset and a maximum phase offset of the possible antenna weight factor combinations;
means for determining an optimum antenna weight factor by using the primary antenna weight factors.

21. A communication terminal, configured to:
first determine possible antenna weight factor combinations, an antenna weight factor combination comprising an antenna weight factor for both power and phase;
select primary antenna weight factors on the basis of bisectors of angles between a minimum phase offset and a maximum phase offset of the possible antenna weight factor combinations;
second determine an optimum antenna weight factor by using the primary antenna weight factors; and
signal the optimum antenna weight factor to the network element.

22. A communication terminal, configured to:
store possible antenna weight factor combinations, an antenna weight factor combination comprising an antenna weight factor for both power and phase;
select primary antenna weight factors on the basis of bisectors of angles between a minimum phase offset and a maximum phase offset of the possible antenna weight factor combinations;
determine an optimum antenna weight factor by using the primary antenna weight factors; and
signal the optimum antenna weight factor to the network element.

23. A device, configured to:
determine possible antenna weight factor combinations, an antenna weight factor combination comprising an antenna weight factor for both power and phase;
select primary antenna weight factors on the basis of bisectors of angles between a minimum phase offset and a maximum phase offset of the possible antenna weight factor combinations;
determine an optimum antenna weight factor by using the primary antenna weight factors; and
signal the optimum antenna weight factor to the network element.

24. A device, configured to:
store possible antenna weight factor combinations, an antenna weight factor combination comprising an antenna weight factor for both power and phase;
select primary antenna weight factors on the basis of bisectors of angles between a minimum phase offset and a maximum phase offset of the possible antenna weight factor combinations;
determine an optimum antenna weight factor by using the primary antenna weight factors; and
signal the optimum antenna weight factor to the network element.

25. A module, configured to:
determine possible antenna weight factor combinations, an antenna weight factor combination comprising an antenna weight factor for both power and phase;
select primary antenna weight factors on the basis of bisectors of angles between a minimum phase offset and a maximum phase offset of the possible antenna weight factor combinations;
determine an optimum antenna weight factor by using the primary antenna weight factors.

26. A module, configured to:
store possible antenna weight factor combinations, an antenna weight factor combination comprising an antenna weight factor for both power and phase;
select primary antenna weight factors on the basis of bisectors of angles between a minimum phase offset and a maximum phase offset of the possible antenna weight factor combinations;
determine an optimum antenna weight factor by using the primary antenna weight factors.

* * * * *

UNITED STATES PATENT AND TRADEMARK OFFICE
CERTIFICATE OF CORRECTION

PATENT NO. : 7,088,289 B1
APPLICATION NO. : 11/099341
DATED : August 8, 2006
INVENTOR(S) : Peltola

Page 1 of 1

It is certified that error appears in the above-identified patent and that said Letters Patent is hereby corrected as shown below:

On the Title Page item 75, the inventor's name should read:  Ari --Juhani-- Peltola.

Signed and Sealed this

Twelfth Day of December, 2006

JON W. DUDAS
*Director of the United States Patent and Trademark Office*